(12) United States Patent
White et al.

(10) Patent No.: US 10,547,702 B2
(45) Date of Patent: Jan. 28, 2020

(54) INTERNET PROTOCOL OVER A CONTENT-CENTRIC NETWORK (IPOC)

(71) Applicant: Cable Television Laboratories, Inc., Louisville, CO (US)

(72) Inventors: Greg White, Louisville, CO (US); Greg Rutz, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 32 days.

(21) Appl. No.: 15/615,022

(22) Filed: Jun. 6, 2017

(65) Prior Publication Data

US 2018/0131673 A1 May 10, 2018

Related U.S. Application Data

(60) Provisional application No. 62/421,226, filed on Nov. 12, 2016, provisional application No. 62/418,537, filed on Nov. 7, 2016.

(51) Int. Cl.
*H04L 29/08* (2006.01)
*H04L 29/06* (2006.01)
*H04L 12/725* (2013.01)
*H04L 12/803* (2013.01)

(52) U.S. Cl.
CPC ......... *H04L 67/2842* (2013.01); *H04L 69/22* (2013.01); *H04L 45/306* (2013.01); *H04L 47/125* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 8,165,118 B2 * | 4/2012 | Stewart | H04L 65/1006 370/389 |
| 9,270,598 B1 * | 2/2016 | Oran | H04L 67/327 |
| 10,291,512 B2 * | 5/2019 | Moiseenko | H04L 45/24 |
| 10,397,066 B2 * | 8/2019 | Valencia Lopez | |
| 2009/0287835 A1 | 11/2009 | Jacobson | |
| 2013/0018937 A1 | 1/2013 | Kim | |
| 2013/0173822 A1 * | 7/2013 | Hong | H04L 67/327 709/232 |

(Continued)

OTHER PUBLICATIONS

CCNx Semantics, draft-irtf-icnrg-ccnxsemantics-03, ICNRG M. Mosko, I. Solis, LinkedIn, C. Wood, PARC, Inc., Jun. 28, 2016.

(Continued)

*Primary Examiner* — Michael J Moore, Jr.
(74) *Attorney, Agent, or Firm* — Great Lakes Intellectual Property, PLLC

(57) ABSTRACT

Internet Protocol (IP) over a content/name/information centric network is contemplated, such as for devices, software or other entities lacking capabilities sufficient to natively support content/name/information centric networking and/or the related messaging protocols and requirements. The contemplated IP over content/name/information centric networking may be facilitated with encapsulation and decapsulation of IP packets when forwarded over a content/name/information centric network as well as attendant processing and protocols created to facilitate the operation thereof.

20 Claims, 5 Drawing Sheets

(56) References Cited

U.S. PATENT DOCUMENTS

| | | | |
|---|---|---|---|
| 2013/0227166 A1* | 8/2013 | Ravindran | H04L 67/327 |
| | | | 709/238 |
| 2015/0350078 A1* | 12/2015 | Azgin | H04L 45/306 |
| | | | 370/392 |
| 2015/0373162 A1* | 12/2015 | Mosko | H04L 69/22 |
| | | | 370/392 |
| 2016/0105394 A1* | 4/2016 | Rangarajan | H04L 61/302 |
| | | | 709/223 |
| 2016/0156714 A1 | 6/2016 | Farhadi | |
| 2016/0191257 A1* | 6/2016 | Garcia-Luna-Aceves | |
| | | | H04L 12/185 |
| | | | 370/390 |
| 2016/0352614 A1* | 12/2016 | Valencia Lopez | H04L 45/021 |
| 2016/0366620 A1* | 12/2016 | Royon | H04L 67/10 |
| 2017/0012867 A1* | 1/2017 | Royon | H04L 45/42 |
| 2017/0048346 A1* | 2/2017 | Ravindran | H04L 67/2842 |
| 2017/0078199 A1* | 3/2017 | Mosko | H04L 45/7453 |
| 2017/0289114 A1* | 10/2017 | Wood | H04L 9/3247 |
| 2017/0324704 A1* | 11/2017 | Wood | H04L 61/305 |
| 2017/0373975 A1* | 12/2017 | Moiseenko | H04L 45/748 |
| 2018/0103128 A1* | 4/2018 | Muscariello | H04L 45/745 |
| 2018/0109454 A1* | 4/2018 | Holmberg | H04L 45/7453 |
| 2018/0205655 A1* | 7/2018 | Ueda | H04L 12/66 |
| 2018/0227390 A1* | 8/2018 | Reznik | H04L 67/327 |
| 2018/0270300 A1* | 9/2018 | Reznik | H04L 61/1511 |
| 2018/0367327 A1* | 12/2018 | Trossen | H04L 12/1859 |

OTHER PUBLICATIONS

CCN 1.0 Protocol Architecture, Marc Mosko, Ignacio Solis, Ersin Uzun, Palo Alto Research Center.

* cited by examiner

INTERNET PROTOCOL OVER A CONTENT-CENTRIC NETWORK (IPOC)

CROSS-REFERENCE TO RELATED APPLICATIONS

This application claims the benefit of U.S. provisional Application No. 62/418,537 filed Nov. 7, 2016 and the benefit of U.S. provisional Application No. 62/421,226 filed Nov. 12, 2016, the disclosures of which are incorporated in their entireties by reference herein.

TECHNICAL FIELD

The present invention relates to Internet Protocol (IP) and content/name/information centric networking, such as but not necessary limited to facilitating IP over a content/name/information centric network for devices, software or other entities lacking capabilities sufficient to natively support communication over a content/name/information centric network and/or the related messaging protocols and requirements.

BACKGROUND

Information Centric Networking is an emerging networking approach that aims to address many of the shortcomings inherent with Internet Protocol (IP) networking. One specific approach to Information Centric Networking, also known as Content-Centric Networking (CCN) and/or Named Data Networking (NDN), appears to be gaining mindshare in the research community and in industry, and promises to significantly improve network scalability, performance, and reduce cost in comparison to a network built on the IP. CCN/NDN provides native and elegant support for client mobility, multipath connectivity, multicast delivery and in-network caching; many of which are critical for current and future networks, and all of which require inefficient and/or complex managed overlays when implemented in IP. Further, CCN/NDN provides a much richer addressing framework than that existing in IP, which could eliminate significant sources of routing complexity, as well as enabling client devices to utilize multiple network attachments (e.g. multiple radio links) simultaneously for reliability or greater performance and/or for enabling content retrieval from an on-path cache.

A significant hurdle that stands in the way of deploying a CCN-only network is that many, if not all, of the applications in-use on corresponding network devices today (both client and server) are built to use IP. This hurdle could be addressed by requiring that all applications be rewritten to use CCN natively, however, this is a tall order in a world with millions of smartphone apps, devices, etc. Another approach could be to deploy a hybrid network in which the routers support forwarding both IP and CCN, however, this adds cost and complexity to the network, both in terms of equipment and in terms of operations. One non-limiting aspect of the present invention contemplates a way to eliminate these hurdles by establishing an IP over CCN capability that is transparent to the IP applications on either end, i.e., source and destination, IP-dependent devices.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
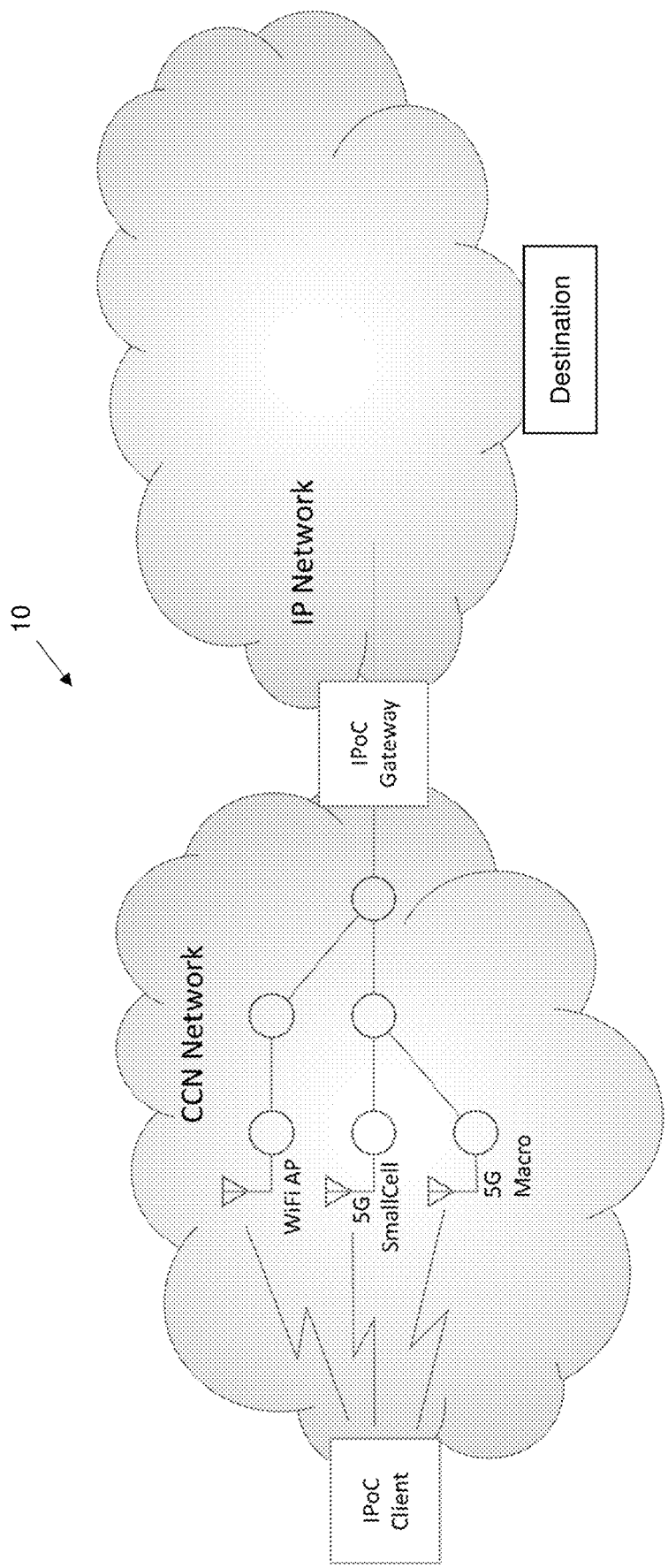
FIG. 1 illustrates a system for networking in accordance with one non-limiting aspect of the present invention.

FIG. 1 illustrates a system 10 for networking in accordance with one non-limiting aspect of the present invention. The system 10 may be configured to facilitate Internet Protocol (IP) over the above-described name-data network (NDN) or information-centric network (ICN) and is predominately described for exemplary non-limiting purposes with respect to facilitating IP over a content-centric network (CCN) (IPoC). The CCN may be configured to operate according to any suitable response and request protocol whereby content, data, objects, files, information, signaling, messages, etc. may be routed according to names associated therewith, and is predominantly described for exemplary purposes with respect to operating in a manner commensurate with the processes, messaging and other operations described within CCNx Semantics (draft-irtf-icnrg-ccnxsemantics-03) as published by The Internet Engineering Task Force (IETF), Jun. 28, 2016, and/or CCN 1.0 Protocol Architecture as published by Marc Mosko, Ignacio Solis, Ersin Uzun of the Palo Alto Research Center, the disclosures of which are hereby incorporated by reference in their entireties herein. The CCN is shown to include a plurality of nodes (labeled with circles) configured to facilitate forwarding messages for clients connected thereto or otherwise associated therewith, such as in the manner described in U.S. patent application Ser. No. 15/345,333, entitled Preemptive Caching Of Content In A Content-Centric Network, the disclosure of which is hereby incorporated by reference in its entirety herein.

The nodes may be virtually any device having capabilities sufficient to facilitate routing, forwarding, relaying, processing or otherwise exchanging upstream and downstream signaling for one or more associated clients. An IP network is separately illustrated with respect to the CCN in order to demonstrate one non-limiting aspect of the present invention where a client and/or a node desires to communicate IP-based or IP-formatted messaging with a destination connected to the IP network such that at least a portion of the corresponding signaling traverses the CCN. The IP network may correspond with virtually any network operating according to IP, which may be considered as a network operating according a network layer protocol that supports connectionless internetwork service and which contains addressing and control information that allows packets to be routed—many IP devices support IP version 4 (IPv4) defined in RFC-791, the disclosure of which is incorporated by reference in its entirety herein, and/or IP version 6 (IPv6, RFC-2460), the disclosure of which is also incorporated by reference in its entirety herein. One non-limiting aspect of present invention particularly contemplates compensating for the IP addressing used over the IP network being insufficient to facilitate corresponding communications over the CCN and/or the addressing used over the CCN being insufficient to facilitate corresponding communications over the IP network.

The CCN/NDN technology defines two packet types, an "interest message" packet and a "data" packet (while both CCN/NDN use the term "interest message", CCN refers to the data packet as a "content object message"). The present invention predominately references a request for a piece of content to occur with issuance of an interest message and a response thereto, i.e., delivery of the requested piece of content, to occur with issuance of a content object message for exemplary non-limiting purposes as the present invention fully contemplates its use and application with other types of protocols, messaging or nomenclatures. An interest message may be used to identify the resource, e.g., piece of content or data object, that is being requested, which may be identified by a name that optionally includes provenance. In some cases, the name uniquely (in a global sense) may identify a specific content object message, and in other cases it may contain wildcards that indicate that any of a set of content object messages that could satisfy the request, e.g., a request for any or selected content object messages having names, values, etc. within a predefined prefix, range, wildcard or suitable identification. When a client device launches an interest message (packet, message, etc.) into the CCN, it expects a corresponding content object message in response, i.e., it expects another node receiving the interest message having the corresponding content to respond with a corresponding content object message or to forward the interest message to another node for similar processing until the desired content is found.

Figure 2:
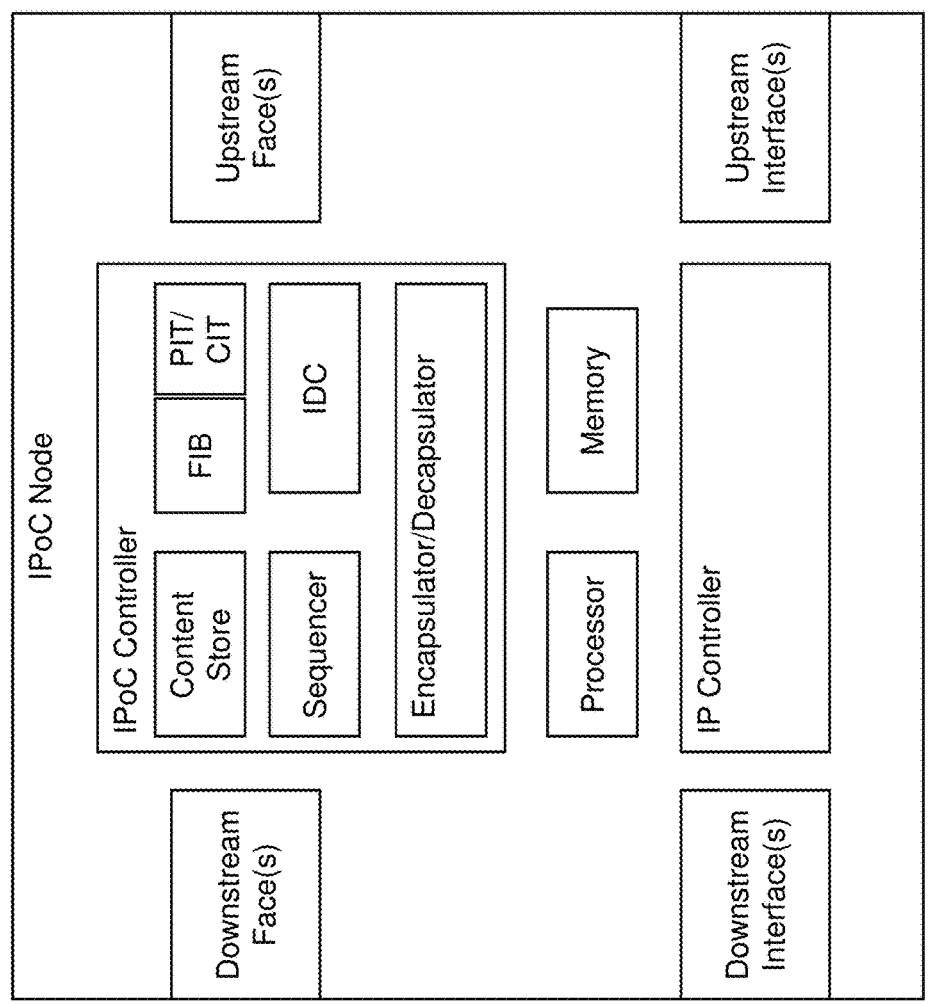
FIG. 2 illustrates an IPoC node in accordance with one non-limiting aspect of the present invention.

FIG. 2 illustrates an IPoC node 12 in accordance with one non-limiting aspect of the present invention. The IPoC node may include a processor for executing instructions stored within a non-transitory computer-readable medium to facilitate the processes and operations contemplated herein. While the purpose of a node (router) in CCN/NDN is largely the same as a router in the world of IP, i.e., moving packets closer to the intended recipient, the functions of a node in CCN/NDN differ considerably from those of an IP router. A CCN/NDN node may consist of a set of faces. The term "face" is used as a more general replacement for "interface", since it not only includes the physical and logical interfaces, but also the applications that reside on the node. To manage packet forwarding, the node may include an IPoC controller and maintain three data structures: a Pending Interest message Table (PIT); a Forwarding Information Base (FIB) and a Content Store (CS). When an Interest message arrives on a particular face, the node first checks the Content Store (CS) to see if a matching content object message is already present in cache. If so, it immediately sends a copy of the content object message to the face on which the corresponding Interest message arrived, optionally without altering the content object message in any way. Since addressing, like traditional IP source/destination addresses, is not included in the content object message, there is no need to prepend this information to the corresponding messaging, and since each content object message is uniquely named and digitally signed by its origin, it makes no difference to the IPoC node whether the content object message was delivered by an intermediary, or came directly from the origin.

If a matching data packet does not exist in cache (CS), the node checks to see if a matching entry already exists in the PIT. If a matching entry already exists in the PIT, the node simply adds the face to the existing PIT entry, and discards the Interest message. If a match is not found, the node creates a new entry (including the face on which the Interest message arrived), and then forwards the Interest message out one or more faces based on the content of the FIB (the corollary to the routing table or FIB in an IP router). The FIB may be configured to map name prefixes to faces and to use a longest match approach (conceptually similar to IP routing) to find the appropriate FIB entry for a particular interest message. The FIB entry can identify multiple faces on which the interest message could be forwarded. Making decisions about which face to use in this situation is a function of a "strategy" layer within the IPoC controller. The strategy could deterministically select a face based on history of response times, link cost, or other criteria. Alternatively it could stochastically select a face, perhaps weighting its selection based on these criteria, in order to load-balance traffic to multiple content sources. A sequencer may be utilized to facilitate sequencing and resequencing packets, messages, etc., optionally according to previously assigned sequence numbers, which may be generated, optionally uniquely, for each message as monotonically increasing values with rollover. An interest message deficit count (IDC) may be configured to facilitate maintaining in-flight entries in the PIT of other nodes and/or to otherwise facilitate pending interest messages sufficient facilitate forwarding IP messages as contemplated herein.

The IPoC controller may facilitate sending the interest messages out multiple faces, such as in the manner illustrated in FIG. 1 whereby multiple interest messages, optionally simultaneously, are forwarded from an IPoC client to multiple nodes, which may be useful when forwarding IP packets associated with an IP flow or other operation of a client. While this "fanning out" of interest messages is not expected to be used frequently (lest the network be overcome with proliferating interest messages), it could enable the network to quickly locate the nearest copy of a content object message, as well as to move the interest message closer to the content origin in the absence of a converged routing topology. When a content object message arrives on a particular face, the node checks its PIT to see if any faces have requested the packet. If so, it forwards a copy of the content object message to the indicated face(s), deletes the PIT entry, and optionally stores the content object message in the content store. Thus, when an interest message is launched into the network by the client, it may traverse several intermediate nodes, and potentially be fanned out in different directions. At each intermediate node, a PIT entry is created identifying, for that node, which direction to send the corresponding content object message when it arrives. Once a node identifies that it has the content object message in its content store, or can respond to the interest message itself (via a resident application), the content object message follows a "breadcrumb" trail of PIT entries created by the interest message back to the client that initiated it. Every node in the CCN can check the digital signature of each content object message, and discard any invalid packets. In general, the end client would be expected to perform this validation, as would any intermediate node that caches the content object message. In the CCN, if the content object message has a Content object message Hash, each node may be required to validate the hash and discard the packet if it does not validate.

One aspect of the CCN is that it can inherently handle "flash-crowd" events very efficiently via the distributed cache and multicast-like distribution system. Since the interest messages from multiple clients can become aggregated in PIT entries as they flow toward the content origin, the resulting content object message forwarding may be automatically performed in a very efficient, multicast-like way with each node replicating the packet to as many faces as needed, but sending only one copy on each face. Further, even in the case that interest messages are not simultaneous, if each router node in the CCN caches the popular content object message in its content store, the forwarding is just as efficient (except in the case of a shared final link, where multiple copies of the content object message would be sent). In addition to significantly reducing the network burden of handling these types of events, the CCN massively reduces the burden on the origin server because it may only ever need to send one copy of any content object message into the network. An additional benefit is that the traditional DoS and DDoS attacks become much less effective (although other CCN/NDN-specific attacks are possible). This in-line caching also allows very efficient recovery from packet loss. While it does require that the client time-out and re-send its interest message, the content object message does not need to be retrieved from the original location, only from node immediately preceding the loss.

The IPoC node is predominately described as a standalone entity configured to facilitate forwarding, routing or otherwise facilitating signaling between upstream and downstream faces capable of interacting with wired and/or wireless communication mediums. The IPoC node is intended to generally refer to any entity distributed in a networked environment capable of operating in accordance with the described architectures, protocols and messaging associated with content/name/information centric networking, e.g., capable of facilitating non-IP-based communications. The IPoC node may include a controller for controlling the operation thereof being provided with a processor configured to facilitate executing non-transitory instructions stored within a non-transitory computer-readable medium, such as to facilitate preemptively caching content object messages or other files, messages, data, information, etc. as contemplated by the present invention. A content store, sequencer, and interest message deficit count (IDC), a FIB and a PIT are shown for exemplary purposes as being separate from the memory in order to pictorially note the operations and processes described above and associated therewith. The IPoC node may be distinguished from non-IPoC nodes included within the CCN, i.e., traditional CCN nodes, in that it includes additional capabilities and processes for facilitating encapsulation/decapsulating of IP messages with respect to CCN messages and/or independent capabilities for supporting IP messages.

One non-limiting aspect of the present invention contemplates the illustrated IPoC node acting as a gateway between the CCN and the IP network, which is shown in FIG. 1 and referred to herein as an IPoC gateway. When acting as an IPoC gateway, an encapsulator/decapsulator may be included to facilitate interfacing CCN messaging utilized over the CCN with IP messaging utilized over the IP network. The IPoC gateway is shown to include downstream and upstream faces for respectively exchanging CCN messages with the CCN and an upstream CCN (not shown) and downstream and upstream interfaces for exchanging IP messages with the IP network and a downstream IP network (not shown). Optionally, the IPoC gateway may omit and/or disable the faces/interfaces in the event the upstream CCN and/or the downstream IP network are unavailable or otherwise not present. The illustrated IPoC node may similarly act as one of the above-described clients, e.g., a user device or other endpoint, which is shown in FIG. 1 and referred to herein as an IPoC client. The IPoC client and the IPoC gateway are distinguished in the system from the non-IPoC/traditional CCN nodes (shown as circles) in order to demonstrate one non-limiting aspect of the present invention where one or more of the nodes forming the CCN may lack capabilities for encapsulating/decapsulating messages in the manner described herein and/or some or all of the other, non-traditional capabilities of the illustrated IPoC node. This is done for exemplary non-limiting purposes as the CCN may be constructed with a majority or all of the nodes being IPoC nodes of the type illustrated FIG. 2.

Figure 3:
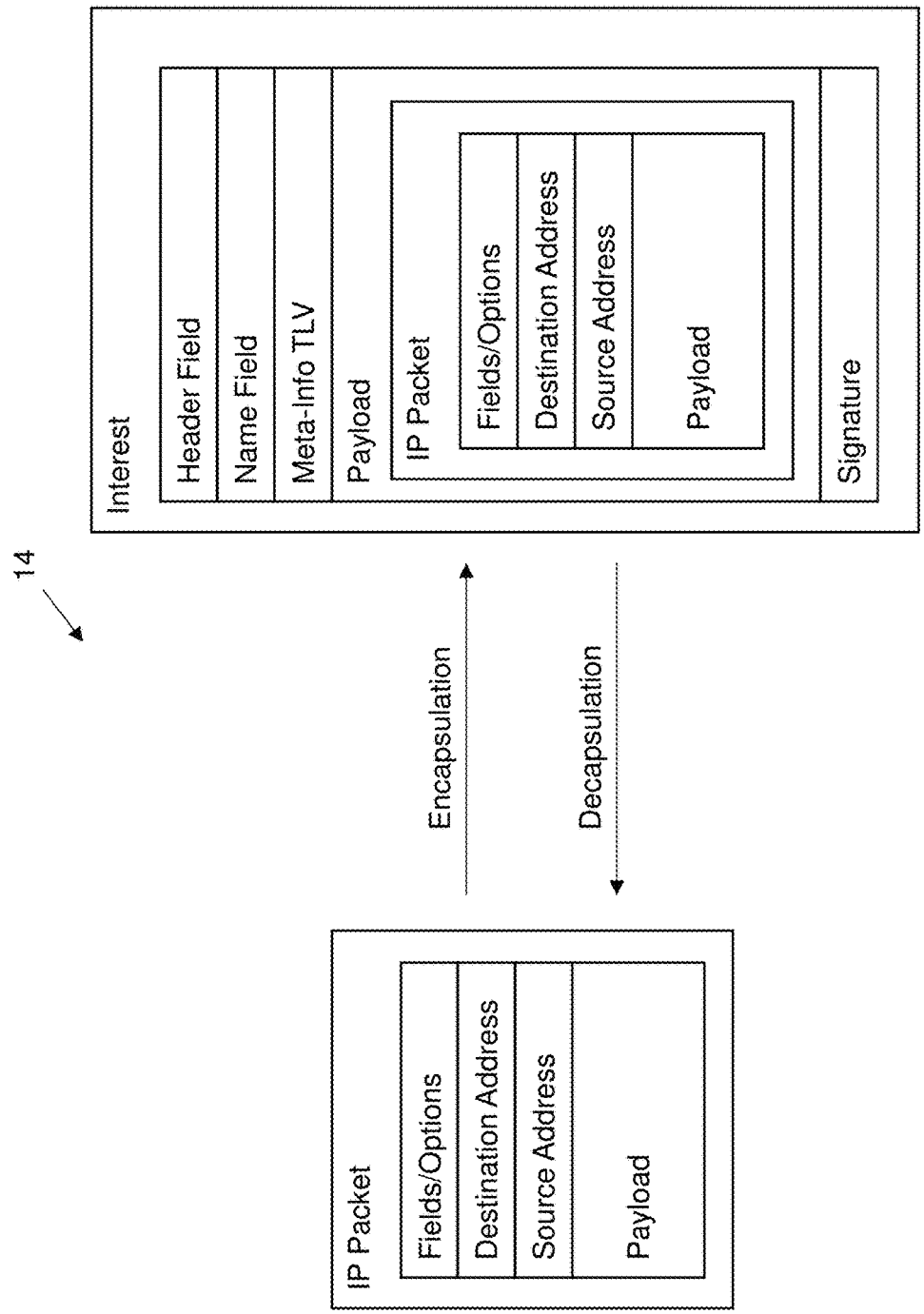
FIG. 3 illustrates an upstream, message conversion process in accordance with one non-limiting aspect of the present invention.

FIG. 3 illustrates an upstream, message conversion process 14 in accordance with one non-limiting aspect of the present invention. The upstream, message conversion process may be associated with the encapsulator/decapsulator of the IPoC node facilitating conversion of an IP packet to a CCN message through encapsulation and conversion of a CCN message to an IP message through decapsulation. The upstream process relates to the CCN message being an interest message communicated from the IPoC client to request or send data, content, etc. from or to the destination or other device associated with the IP network. One non-limiting aspect of the present invention contemplates a need to facilitate the message conversion process when a human-machine interface (HMI), application, application programming interface (API) or other feature is operating and the IPoC client lacks capabilities sufficient to natively communicate over the CCN while including native capabilities sufficient to natively communicate over the IP network, i.e., when the application, etc. is able to generate IP messages but unable to generate the CCN messages needed to communicate over the CCN. The encapsulator/decapsulator included at each of the IPoC client and gateway may be configured to facilitate the message conversion process such that the IPoC client encapsulates the IP packet into an interest message for forwarding over the CCN and the IPoC gateway decapsulates the corresponding interest message to facilitate forwarding the IP packet encapsulated therein over the IP network.

The encapsulation process may generally correspond with the IPoC client encapsulating an entirety of the IP packet within a payload of the interest message such that no portion of the IP packet resides within any portion of the interest message other than the payload. The IPoC client may thereafter generate values for a name field, a header field and the other various fields included within the interest message necessary to facilitate forwarding over the CCN to the IPoC gateway. One non-limiting aspect of the present invention contemplates the IPoC gateway encapsulating each IP packet needing transport from the IPoC client within a single interest message such that each IP packet is encapsulated within no more than one interest message. The one-to-one encapsulation may be beneficial in enabling the IPoC gateway to subsequently decapsulate and resequence the corresponding interest messages one at a time to facilitate forwarding the IP packets included therein over the IP network in a desired sequence and in a manner sufficient to ensure compliance with IP messaging protocols and requirements. The IPoC client may include a naming process, algorithm, etc. sufficient to facilitate generating the unique names required for interest messages associated with the one-to-one encapsulation and in a manner that enables the IP packets traveling downstream in response thereto via content object messages to follow the "breadcrumbs" left over the CCN so as to facilitate subsequent receipt at the IPoC client associated therewith.

The naming process may correspond with any suitable method for individually/uniquely naming each interest message that enables the interest to be routed to the appropriate IPoC gateway, and for the subsequent content object messages to be forwarded from the IPoC gateway over the CCN to the IPoC client, optionally through intermediary, non-IPoC nodes included therebetween. One non-limiting aspect of the present invention contemplates naming each interest message, i.e., generating the values, parameters, data etc. included in the name field of the interest message, according to an IP address delegated to or otherwise associated with the IPoC client, and/or the application, etc. operating thereon to generate IP packets, and optionally with additional sequence numbers, values, bits, etc. uniquely generated for each interest message with the sequencer. The delegated IP address may be included within IP packet(s) as a source address and presumed to sufficiently distinguish the IPoC client from other IPoC clients, devices, etc. such that it may be appended with a wildcard, values, parameters or numbers generated with the sequencer to associate a unique, one-to-one naming convention for each interest message. One such process may include appending or otherwise adding a monotonically increasing sequence number generated with the sequencer for each interest message to the delegated IP address to define the name field included within the interest message. In this manner, a portion of the name field identifies and may be unique to the IPoC client (the delegated IP address) and another portion of the name field may be used to individually distinguish the IP packets and/or interest messages (the sequence number).

Forwarding of the interest messages over the CCN in this manner may occur without naming or otherwise identifying a destination address (IP address) of the IP packet encapsulated therein within the naming field, the header field or other transmission related portion of the interest message. This naming convention may be differentiated from IP-based networking due to IP-based networking requiring identification and use of the destination address in order to facilitate opening a connection, socket, etc. needed to facilitate subsequent communication, i.e., the interest message may be communicated over the CCN without identifying the recipient associated therewith. The intermediate nodes between the IPoC client and IPoC gateway may process the interest messages and the responsive content object messages as described above to facilitate forwarding over the CCN. The IPoC client may forward each of the properly named interest messages over the CCN for receipt at the IPoC gateway whereupon the IPoC getaway may implement the decapsulation process to recover the IP packet included in each interest message. The IPoC gateway may be configured to automatically implement the decapsulation process using wildcard matching or other processes sufficient to trigger the CCN-based operations necessary to terminate further forwarding of the interest message whereupon the corresponding IP packet may be recovered and then subsequently forwarded over the IP network according to IP networking protocols, i.e., as if the IP packet were natively forwarded from the IPoC gateway over the IP network.

The IPoC controller, the sequencer and/or other features may be configured to tabulate or otherwise associate the unique names, or more specifically the sequence numbers, with each IP packet so as to facilitate ordering processing of the IP packets. The IPoC client may notify the IPoC gateway of the particular sequencing convention being used to individually differentiate each IP packet so as to facilitate the sequencer of the IPoC gateway implementing a resequencing process whereby the IP packets may be re-arranged or otherwise resequenced prior to forwarding over the IP network. The resequencing may include processing the IP packets for forwarding over the IP network in a manner matching a sequence of generation at the IPoC client, e.g., the sequence number of multiple IP packets may be compared at the IPoC gateway and thereafter resequenced in numerical order to accommodate for later transmitted IP packets arriving before earlier transmitted IP packets. The resequencing process may be beneficial to ensuring the destination receives the IP packets in the order of generation at the IPoC client as simply forwarding the decapsulated IP packets from the IPoC gateway in the order of receipt may cause the IP packets to reach the destination out of order if the corresponding interest messages arrive at the IPoC gateway in a sequence differing from that in which they were generated due to routing or other differences over the CCN, i.e., differences may result from multiple routes, paths etc. being utilized over the CCN, particularly when multiple faces of the IPoC gateway are utilized as the route and/or communication capabilities of each face may differ.

Figure 4:
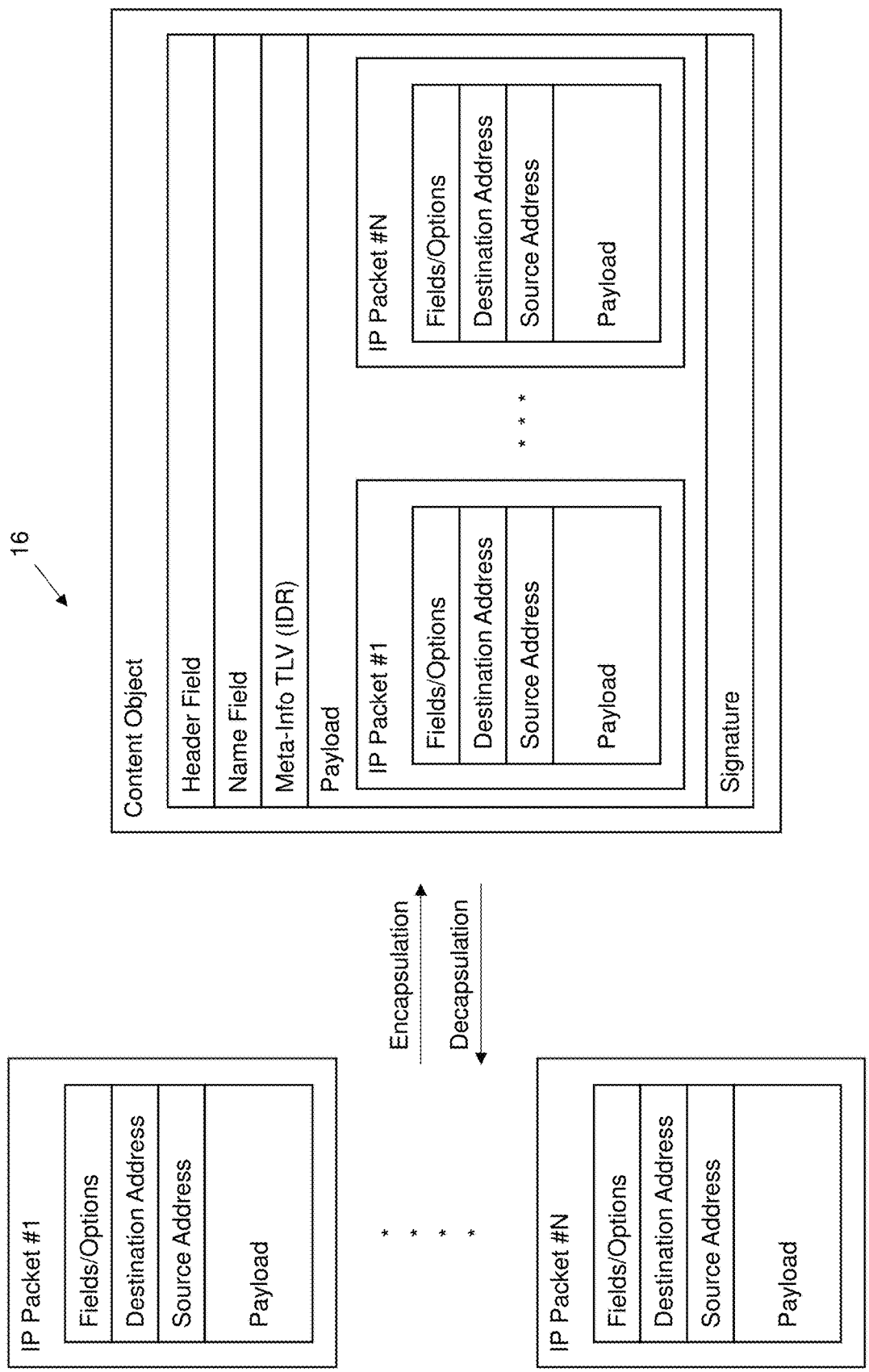
FIG. 4 illustrates a downstream, message conversion process in accordance with one non-limiting aspect of the present invention.

FIG. 4 illustrates a downstream, message conversion process 16 in accordance with one non-limiting aspect of the present invention. The downstream, message conversion process may generally correspond with the above-described encapsulation/decapsulation processes operating in reverse whereby IP packets are received at the IPoC gateway from the destination and subsequently encapsulated for forwarding over the CCN to the IPoC client. A content object message may be used in accordance with CCN-based messaging requirements to convey the encapsulated IP packets downstream from the IPoC gateway to the IPoC client. Unlike IP packet/messaging that has a fixed payload capacity, CCN-messaging is not so limited and can accommodate greater capacities, both in the interest message and content object messages, whereby virtually any size payload may be supported depending on trade-off for content stores and other attendant nodal/networking requirements. One non-limiting aspect of the present invention contemplates capitalizing on the larger capacity of CCN-messaging to encapsulate multiple, downstream IP packets within the content object messages. In this manner, the downstream message conversion process may differ from the upstream, message conversion process at least in so far as the content object messages optionally being encapsulated to include more than one IP packet or a one-to-many encapsulation. While the present invention fully contemplates similar one-to-many encapsulation for the upstream, message conversion process, it is believed that the one-to-one encapsulation may be more efficient and performant in facilitating resequencing and otherwise organizing forwarding of the IP packets over the IP network.

The IPoC gateway may implement a naming process whereby a name field of the content object message is populated to facilitate forwarding over the CCN to the appropriate IPoC client. Rather than generating the naming field anew as in the interest message naming process, the content object message naming process may rely upon entries included in a Client Interest Table (CIT) kept at the IPoC gateway to facilitate populating the naming field and forwarding the corresponding content object message over the CCN. As the IP packets being received at the IPoC gateway include a destination address matching the source address of the IP packet triggering its formation, the CIT kept at the IPoC gateway for each of the supported IPoC clients may be cross-referenced with the destination address included within the arriving IP packets to determine the appropriate IPoC client and the attendant naming field, etc. needed to facilitate forwarding of the corresponding content object message thereto. The IPoC controller may perform a wildcard or other, even partial, matching process whereby the destination IP address included in the arriving IP packets may be cross-referenced for entries in the CIT to determine appropriate routing requirements for forwarding the corresponding content object message over the CCN. The CIT kept at the IPoC gateway, for example, may relate the entire naming field included with previously received interest messages (source address+sequence number) and/or a portion of the naming field (source address) such that the entries can be cross-referenced with the destination IP addresses included in the arriving IP packets to determine an appropriate entry in the CIT.

The IPoC gateway may implement the sequencer to facilitate including sequence numbers with the forwarded content object messages in a manner similar to that described above so as to enable the IPoC client to resequence the IP packets encapsulated therein. The encapsulation the IP packets within the content object message may occur in the order of receipt such that the IPoC client may infer a matching ordering in the content object message when multiple IP packets are included therein. The sequencer may optionally include additional sequence numbers to facilitate individually sequencing IP packets included in content object messages having multiple encapsulations in the event the encapsulated sequencing is in a different order.

The IPoC client may implement the IDC such that an IDC value is decremented upon transmission of an Interest message, and is incremented upon reception of a content object message. The IPoC client may further be implemented such that it issues an additional Interest message, and, as a result, increments the IDC, whenever the IDC value is less than zero. The additional interest messages may be blank interest messages, interest messages having no payload or other payload.

One non-limiting aspect of the present invention contemplates the IPoC client limiting the IDC value to a range such as $-IDC\_limit < IDC < IDC\_limit$ where IDC_limit is (e.g.) 5.

One non-limiting aspect of the present invention contemplates the IPoC gateway additionally including an interest message deficit report (IDR) within the content object message. The IDR may include values sufficient for incrementing, decrementing or maintaining the IDC kept at the corresponding IPoC client for purposes of facilitating generation of additional interest messages, which may be referred to as in-flight interest messages. The in-flight interest messages may be empty messages, i.e., lacking payloads and/or IP packets, and transmitted from the IPoC client for purposes of creating corresponding entries in the CIT at the IPoC gateway and in the PIT at the intermediate CCN nodes for the IPoC client so as to ensure at least one or more entries are available for forwarding content object messages encapsulated with IP packets subsequently received at the IPoC gateway for the IPoC client. For example, the IDR can be set to a value of 1 to further increment the IDC, a value of −1 to further decrement the IDC and the value of 0 to maintain the current IDC.

The interest messages forwarded from the IPoC client, or more particularly the IP packets encapsulated therein, may prompt the destination to responsively forward more IP packets then it receives, i.e., one-to-many scenario may arise where many responsive IP packets may be generated in response to receipt of one IP packet. Depending on the number of IP packets being encapsulated within corresponding content object messages, the IPoC gateway may require additional entries within the CIT in order to facilitate encapsulating and forwarding content object messages sufficient to facilitate communication of the responsive IP packets to the IPoC client. The IDR may be utilized in this regard to facilitate controlling the IPoC client to forward in-flight interest messages needed for maintaining a sufficient number of entries in the PIT and CIT to ensure the additional IP packets can be encapsulated and forwarded. The IPoC gateway may implement a target number of CIT entries for the IPoC client that it seeks to maintain during idle conditions: min_CIT (e.g. 10). The IDR may be correspondingly set such that when the current count of entries in the CIT is less than the min_CIT an in-flight interest message is issued and when the IDC is equal to or greater than the min_CIT an in-flight interest message not issued. The min_CIT could be dynamically adjusted based on traffic expectations over the CCN.

The IPoC gateway may have a maximum size for its CIT. At times, such as after a period of heavy activity has concluded, the IPoC gateway may receive an Interest message when its CIT is already full. In these cases, the IPoC gateway may dequeue a CIT entry from the head of the CIT, and generate an empty content object, with an IDR value of −1, in order to immediately make space for the newly arrived CIT entry, and to suppress the generation of an Interest message by the corresponding IPoC client.

Figure 5:
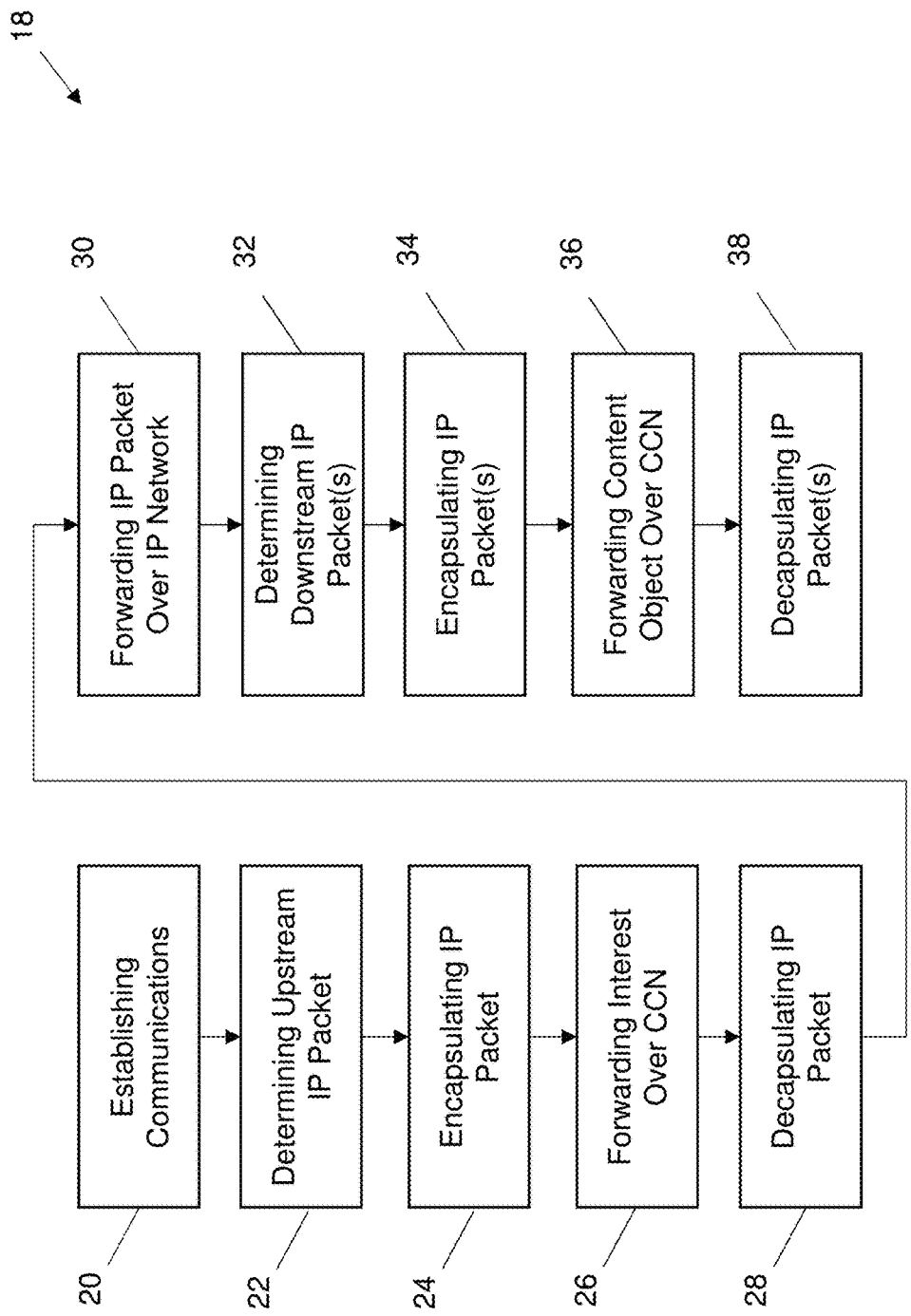
FIG. 5 illustrates a flowchart for a method of facilitating IPoC in accordance with one non-limiting aspect of the present invention.

FIG. 5 illustrates a flowchart 18 for a method of facilitating IPoC in accordance with one non-limiting aspect of the present invention. The method and/or the processes, operations and/or other logical executions associated therewith may be facilitated with less or more operations, etc. and in any order and/or with processor execution of corresponding instructions stored within a non-transitory computer-readable mediums associated with one or more of the above-described entities. One non-limiting aspect of the present invention particularly contemplates a processor of the IPoC client executing instructions stored on a computer-readable medium associated therewith to enable applications, software, programs or other features executing an IPoC client lacking native capabilities to communicate over the CCN to forward/receive IP packets over/from the IP network via the CCN with use of corresponding interest messages and content object messages. One non-limiting aspect of the present invention particularly contemplates a processor of the IPoC gateway executing instructions stored on a computer-readable medium associated therewith to facilitate interest messages and content object message exchange with the CCN and IP packet exchange with the IP network necessary to enable the non-CCN applications, software or other features executing the IPoC client.

Block 20 relates to establishing communications for the IPoC client over the CCN with issuance of an interest message to the IPoC gateway. The IPoC client may execute a process for populating a name field of the interest message to include a gateway prefix followed by /init/<random-_string>. For example, if the IPoC client is natively programmed or otherwise instructed with an established IPoC gateway prefix of ccnx:/ipoc, the name may be ccnx:/ipoc/init/2Fhwte2452g5shH4. The IPoC gateway may execute a process that will respond to the ccnx:/ipoc/init prefix by sending IP configuration information within a responsive content object message, similar to the information contained in a DHCP Offer, including an assigned IP address, i.e., the IP address to be used as the source address for IP packets generated at or processed through the IPoC client as contemplated herein. Upon executing a configuring process, the IPoC client may provision itself using the information in the init response (content object message) to thereafter enable the IPoC client to begin IP communication. The naming convention, i.e. the addressing information include in the name field for subsequent interest message messages, may use the following data naming convention of ccnx:/ipoc/<hex_ipaddr>/<b64_seq> whereby:

ccnx:/ipoc corresponds with a name prefix used in all IPoC messages;

hex_ipaddr corresponds with the delegated IP address, which for IPv4 addresses, may include separate name segments with each representing a single octet of an IPv4 address encoded as a hexadecimal string. For example, the hex_ipaddr from the IPoC client with the delegated IPv4 address of 192.168.1.100 may be c0/a8/01/64.

b64_seq corresponds with a base64-encoded value representing the sequence number assigned with the sequencer of the IPoC client for each individual interest message forwarded therefrom.

An example interest message name may be: ccnx:/ipoc/c0/a8/01/64/AAAAGw==. Of course, the foregoing is one exemplary manner for uniquely populating the naming field of the CCN messages at least partially based on the delegated IP address and other processes and methods, particularly those sufficient for IPv6 and/or otherwise sufficient for routing interest messages to the appropriate IPoC gateway, for uniquely identifying the client and for individually sequencing the interest messages, are contemplated and may be used without deviating from the scope and contemplation of the present invention.

Block 22 relates to determining an upstream IP packet or a plurality of IP packets desired for transport from the IPoC client. The IP packets may be generated for any number of reasons and as a function of any number of interactions with the client, such as a user interacting with the HMI, an application executing an Hypertext Transfer Protocol (HTTP), Real-time Transport Protocol (RTP), User Datagram Protocol (UDP), Transmission Control Protocol (TCP), or other IP or IP-packet related request. One non-limiting aspect of the present invention contemplates the IPoC client being a software construct, application, etc. residing on the device interacting with a user or other device as an intermediary within its operating system to facilitate encapsulation/decapsulation and the other operations contemplated herein to facilitate communications over the CCN. Such a construct may thereby determine IP packets requiring forwarding over the CCN from API calls, transmission of IP packets thereto and/or in any other manner where a corresponding device desires to transmit an IP packet but lacks capabilities to forward it over the CCN. While the present invention is predominately described with respect to the IPoC client sourcing or originating the IP packets and/or being an end-device for client-side device, the present invention fully contemplates the IPoC client being associated with a gateway or other interface to the CCN, such as to facilitate interacting the CCN with an IP network connected downstream thereof and in a manner commensurate to the IPoC gateway described above.

Block 24 relates to encapsulating the IP packet or one of the plurality of IP packets determined in Block 22 for forwarding over the CCN. For the sake of simplicity, the method is hereinafter described with respect to forwarding a single IP packet but one having ordinary skill in art will readily recognize that similar processes may be undertaken to forward multiple IP packets, particularly when multiple IP packets are related to each other and/or necessary to facilitate access to services, data download, etc. The encapsulation may be performed with the IPoC client executing a process sufficient for adding, embedding or otherwise including the IP packet within a payload of interest message, which may be performed by encapsulating an entirety of the IP packet, i.e., each bit forming IP packet, within the payload and optionally without altering any formatting, fields or other data/information within the IP packet. The encapsulation process may include populating the header field, name field, the meta-info TLV field and the signature of the interest message. The population process may optionally include generating the addressing or naming related information for the name field in the manner described above whereby the IP address or other unique representation of the IP client is appended with a sequence number other information uniquely identifying the IP packet, e.g., a combination of IPoC client identification/name plus packet individual IP packet differentiation.

Block 26 relates to the IPoC client executing a forwarding process sufficient for facilitating forwarding of the interest message created in Block over the CCN. The forwarding process may include IPoC client populating appropriate entries in the PIT, FIB or other parameters associated with CCN-messaging, such as to designate faces or other associations when multiple interest messages be simultaneously employed and/or when interest messages related to a common stream of IP packets are forwarded through different faces. The forwarding process may also include the IPoC client making adjustments to the IDC as described above to facilitate management of in-flight interest messages, such as by automatically decrementing the IDC upon forwarding of the interest message. The forwarding process may also include IPoC client incrementing the sequencer or otherwise adjusting/changing the sequence number to be used for the next IP packet requiring forwarding and/or to make other adjustments necessary to facilitate uniquely differentiating subsequent IP packets prior to forwarding over the CCN. The forwarding process may also include IPoC client generating a table or other relationship to facilitate matching sequence numbers to corresponding IP flows or sequences of multiple IP packets in the event the IPoC client issues IP packets for different services, applications, processes etc., which may be operating simultaneously thereon.

Block 28 relates to the IPoC gateway receiving the interest message and implementing a decapsulation process for decapsulating the IP packet included therein. The decapsulation process may include the IPoC gateway populating appropriate entries in the PIT, FIB or other parameters associated with CCN-messaging, such as to facilitate generating a "breadcrumb" and other information to facilitate communication of responsive content objects to the IPoC client. Block 30 relates to the IPoC gateway forwarding the decapsulated IP packet over the IP network to a destination associated with the destination IP address included therein. The forwarding process may optionally include the IPoC gateway resequencing or otherwise rearranging decapsulated IP packets to correspond with a sequence of generation at the IPoC client, such as to facilitate forwarding according to the sequence numbers included therein. The forwarding process may include the IPoC gateway forwarding the IP packet without altering any values, information, bits, etc. included therein such that the IP packet appears from the standpoint of the destination to have been issued from the IPoC client, i.e., the source IP address in the IP packet is the IP address delegated to the IPoC client. Optionally, in the case that the IPoC gateway acts a network address translator (NAT) or otherwise determines a need, the source IP address within the IP packet may be altered before forwarding to correspond with an IP address associated with the IPoC gateway to facilitate communication of responsive IP packets thereto.

Block 32 relates to determining a downstream IP packet or a plurality of IP packets being received at the IPoC gateway in response to one or more IP packets previously forwarded therefrom, i.e., the destination responding to the IP packet forwarded in Block 30. The received IP packets may be assigned sequence numbers or otherwise demarcated to track the order of arrival, particularly to account for the possibility of multiple or many IP packets being received in response to a lesser number of IP packets being forwarded to the destination, i.e., to relate multiple downstream IP packets to a corresponding upstream packets and/or to facilitate the IPoC gateway resequencing the downstream IP packets when received to accommodate CCN transmission variables. Block 34 relates to IPoC gateway implementing an encapsulation process for encapsulating one or more of the downstream IP packets within one or more content object messages for forwarding over the CCN to the IPoC client. Block 36 relates the IPoC gateway implementing a forwarding process for forwarding the content object message, optionally including an IDR within the content object message to facilitate generation of in-flight interest messages from the IPoC gateway client and/or for use with resequencing.

Block 38 relates to the IPoC gateway receiving the content object in implementing a decapsulation process for decapsulating the one or more downstream IP packets included therein. The decapsulation process may include IPoC client decrementing the IDC upon receipt of the content object and thereafter further adjusting the IDC according to an IDR if included therein. The decapsulation process may include the IPoC client forwarding or otherwise delivering the decapsulated, downstream IP packet to the application or other entity having previously issued the upstream IP packet associated therewith. This process may optionally require matching sequence numbers or other identifiers to facilitate resequencing the decapsulated, downstream IP packets, determining appropriate IP flows and/or adding references to the decapsulated, downstream IP packets for purposes of facilitating similar associations with the originating entity. The decapsulation process or other related processes may include the IPoC client forwarding one or more in-flight interest messages to the IPoC gateway to facilitate maintenance of suitable entries within its PIT so as to ensure additional downstream IP packets arriving at the IPoC gateway include sufficient entries in the PIT to facilitate their subsequent Collation and forwarding to the IPoC client.

As supported above, one non-limiting aspect of the present invention contemplates defines two entities: an IPoC Client and an IPoC Gateway. The IPoC Client (henceforth referred to as the Client) may exist on the mobile device, and as mentioned above, only sends Interest messages. The IPoC Gateway (henceforth referred to as the Gateway) exists at a fixed location in the network, and publishes a prefix that can be routed to via the CCN network. In general, a network may have many Clients, and possibly several Gateways. The Client functions as a tunnel endpoint, much in the same way that a VPN application does. All IP traffic generated by applications on the mobile device are forwarded via this tunnel endpoint, which encapsulates them in CCN Interest messages, and then sends them into the CCN network. Similarly, the Gateway implementation also acts as a tunnel endpoint, in this case on an IP routing node. It receives Interest messages, unpacks the IP packets inside, and forwards them into an IP network. IP return traffic arriving at the Gateway is encapsulated into CCN Content object messages, and then launched into the CCN network to follow the stateful forwarding path left by the associated Interest message.

In one communication model, the Client is able to send "upstream" packets at any time, by sending Interest messages. The Gateway on the other hand, can only send "downstream" packets (or IPoC control information) when it has a pending Interest message (i.e. it has received an Interest message and has not yet responded with an associated Content object message). As a result, the Client and Gateway work together to ensure that the Gateway is receiving Interest messages sufficiently to support the downstream communication. For each Client, the Gateway may maintain a FIFO queue of names for which it has received Interest messages from the Client, this queue is referred to as the CIT. As this is a FIFO queue, the order in which Interest message names are received is the order in which the associated Content object message responses will be sent. The typical behavior of a Client is to send an Interest message for every Content object message it receives, thus maintaining a constant number of CCN packets "in flight". The Interest Deficit Report is a message element sent in a Content object message from the Gateway to the Client in order to adjust the number of packets in flight and thus maintain an appropriate CIT size.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for facilitating Internet Protocol (IP) over a Content-Centric Network (CCN) (IPoC) comprising:
   receiving a first interest message at an IPoC gateway of the CCN, the IPoC gateway interfacing the CCN with an IP network;
   decapsulating the first interest message at the IPoC gateway to recover a first IP packet encapsulated therein, the first IP packet having been generated at an IPoC client connected to the CCN;
   forwarding the first IP packet from the IPoC gateway over the IP network;
   receiving a second IP packet at the IPoC gateway, the second IP packet having been forwarded over the IP network from an IP source;
   encapsulating the second IP packet at the IPoC gateway within a first content object message;
   forwarding the first content object message from the IPoC gateway over the CCN for receipt at the IPoC client; and
   transmitting a second content object message from the IPoC gateway to the IPoC client in response to receipt of a second interest message from the IPoC client, the second content object message including IP configuration information sufficient for assigning the IPoC client an IP address to be used as a source address for the first IP packet.

2. The method of claim 1 further comprising:
receiving the first interest message at a first CCN face of the IPoC gateway;
forwarding the first IP packet over the IP network from a first IP interface of the IPoC gateway;
receiving the first IP packet at the first IP interface of the IPoC gateway; and
forwarding the first content object message over the CCN from the first CCN face.

3. The method of claim 1 further comprising:
receiving a third IP packet at the IPoC gateway, the third IP packet having been forwarded over the IP network from the IP source; and
encapsulating the third IP packet at the IPoC gateway within the first content object message such that the first content object message includes both of the second and third IP packets.

4. A method for facilitating Internet Protocol (IP) over a Content-Centric Network (CCN) (IPoC) comprising:
receiving a first interest message at an IPoC gateway of the CCN, the IPoC gateway interfacing the CCN with an IP network;
decapsulating the first interest message at the IPoC gateway to recover a first IP packet encapsulated therein, the first IP packet having been generated at an IPoC client connected to the CCN;
forwarding the first IP packet from the IPoC gateway over the IP network;
receiving a second IP packet at the IPoC gateway, the second IP packet having been forwarded over the IP network from an IP source;
encapsulating the second IP packet at the IPoC gateway within a first content object message;
forwarding the first content object message from the IPoC gateway over the CCN for receipt at the IPoC client;
receiving a second interest message at the IPoC gateway;
decapsulating the second interest message at the IPoC gateway to recover a third IP packet encapsulated therein, the third IP packet having been generated at the IPoC client;
performing a resequencing process at the IPoC gateway, the resequencing process including:
i) performing a comparison of a first sequence number included within the first interest message with a second sequence number included within the second interest message; and
ii) determining based on the comparison the third IP packet to have been generated before or after the first IP packet;
forwarding the third IP packet from the IPoC gateway over the IP network before the first IP packet when the resequencing process determines the third IP packet to have been generated before the first IP packet; and
forwarding the third IP packet from the IPoC gateway over the IP network after the first IP packet when the resequencing process determines the third IP packet to have been generated after the first IP packet.

5. A method for facilitating Internet Protocol (IP) over a Content-Centric Network (CCN) (IPoC) comprising:
receiving a first interest message at an IPoC gateway of the CCN, the IPoC gateway interfacing the CCN with an IP network;
decapsulating the first interest message at the IPoC gateway to recover a first IP packet encapsulated therein, the first IP packet having been generated at an IPoC client connected to the CCN;
forwarding the first IP packet from the IPoC gateway over the IP network;
receiving a second IP packet at the IPoC gateway, the second IP packet having been forwarded over the IP network from an IP source;
encapsulating the second IP packet at the IPoC gateway within a first content object message;
forwarding the first content object message from the IPoC gateway over the CCN for receipt at the IPoC client; and
including an interest message deficit report (IDR) within the first content object message, the IDR being sufficient for instructing the IPoC client to one of increment, decrement or maintain an interest message deficit count (IDC) kept at the IPoC client, the IDC being kept at the IPoC client for purposes of facilitating transmission of an in-flight interest message from the IPoC client to the IPoC gateway over the CCN, the in-flight interest message being sufficient to facilitate adding an entry for the IPoC client within a client interest table (CIT) kept at the IPoC gateway.

6. The method of claim 1 further comprising transmitting the first content object message from the IPoC gateway to the IPoC client without relying on the IP address to facilitate forwarding over the CCN.

7. The method claim 1 further comprising transmitting the first content object message from the IPoC gateway to the IPoC client without including the IP address in a header field of the first content object message.

8. The method of claim 1 further comprising transmitting the IP address from the IPoC gateway to the IPoC client within a payload of the second content object message.

9. The method of claim 1 further comprising:
generating the first IP packet at the IPoC client;
encapsulating the first IP packet at the IPoC client within the first interest message;
forwarding the first interest message from the IPoC client over the CCN for receipt at the IPoC gateway;
receiving the first content object message over the CCN at the IPoC client; and
decapsulating the first content at the IPoC client to recover the second IP packet encapsulated therein.

10. A non-transitory computer-readable medium having a plurality of instructions for facilitating Internet Protocol (IP) over a Content-Centric Network (CCN) (IPoC) when executed with a processor of an IPoC gateway configured to interface a CCN with an IP network, the CCN requiring interest and content object messages used to respectively request and deliver content to be addressed to unique names associated therewith, the IP network requiring IP packets used to request and deliver content to be addressed to respective IP addresses of a source and a destination associated therewith, the plurality of instructions being sufficient for:
decapsulating a first interest message received over the CCN to recover a first IP packet encapsulated therein, the first interest message having been forwarded from an IPoC client connected to the CCN and addressed to a first name, the first IP packet having been addressed to a first source IP address and a first destination IP address;
generating a first entry in a pending interest table (PIT) indicating a face of the IPoC gateway receiving the first interest message;

generating a second entry in a client interest table (CIT) indicating a cross-reference of the first name with the first source IP address; and forwarding the first IP packet over the IP network to a destination associated with the first destination IP address.

11. The non-transitory computer-readable medium of claim 10 wherein the plurality of instructions are sufficient for:

receiving a second IP packet forwarded over the IP network from the destination, the second IP packet including a second source IP address matching the first destination IP address and a second destination IP address matching the first source IP address;

encapsulating the second IP packet within a first content object message addressed to the first name, the first content object message including an interest deficit count (IDC) value for instructing the IPoC client to adjust or maintain an IDC;

forwarding the first content object message through the face for receipt at the IPoC client, the IPoC client responsively transmitting an in-flight interest message when the IDC is thereafter within a range; and deleting the first entry and the second entry from the PIT and the CIT following forwarding of the first content object message.

12. The non-transitory computer-readable medium of claim 10 wherein the plurality of instructions are sufficient for transmitting a second content object message to the IPoC client in response to receipt of a second interest message from the IPoC client, the second content object message including IP configuration information sufficient for assigning the IPoC client the first source IP address.

13. The non-transitory computer-readable medium of claim 10 wherein the plurality of instructions are sufficient for forwarding the first IP packet over the IP network without including the first name therein.

14. A method for facilitating Internet Protocol (IP) over a Content-Centric Network (CCN) (IPoC) comprising:

encapsulating IP messages within interest messages and content object messages being communicated over a CCN between an IPoC client and an IPoC gateway; and instructing the IPoC client to transmit a portion of the interest messages for maintaining entries in pending interest tables (PITs) of the IPoC gateway, the entries facilitating routing of the content object messages over the CCN when a scenario results in a quantity of the content object messages exceeding a quantity of the interest messages.

15. The method of claim 14 further comprising instructing the IPoC client to transmit the portion in response to receipt of one of the content object messages when an interest deficit count (IDC) kept thereat is within a range.

16. The method of claim 15 further comprising including instructions within the content object messages for instructing the IPoC client to responsively adjust or maintain the IDC before determining whether the IDC is within the range.

17. A method for facilitating Internet Protocol (IP) over a Content-Centric Network (CCN) (IPoC) having an IPoC gateway to interface a CCN with an IP network, the CCN requiring interest and content object messages used to respectively request and deliver content to be addressed to unique names associated therewith, the IP network requiring IP packets used to request and deliver content to be addressed to respective IP addresses of a source and a destination associated therewith, the method comprising:

decapsulating a first interest message received over the CCN to recover a first IP packet encapsulated therein, the first interest message having been forwarded from an IPoC client connected to the CCN and addressed to a first name, the first IP packet having been addressed to a first source IP address and a first destination IP address;

generating a first entry in a pending interest table (PIT) indicating a face of the IPoC gateway receiving the first interest message;

generating a second entry in a client interest table (CIT) indicating a cross-reference of the first name with the first source IP address; and forwarding the first IP packet over the IP network to a destination associated with the first destination IP address.

18. The method of claim 17 further comprising:

receiving a second IP packet forwarded over the IP network from the destination, the second IP packet including a second source IP address matching the first destination IP address and a second destination IP address matching the first source IP address;

encapsulating the second IP packet within a first content object message addressed to the first name, the first content object message including an interest deficit count (IDC) value for instructing the IPoC client to adjust or maintain an IDC;

forwarding the first content object message through the face for receipt at the IPoC client, the IPoC client responsively transmitting an in-flight interest message when the IDC is thereafter within a range; and deleting the first entry and the second entry from the PIT and the CIT following forwarding of the first content object message.

19. The method of claim 17 further comprising transmitting a second content object message to the IPoC client in response to receipt of a second interest message from the IPoC client, the second content object message including IP configuration information sufficient for assigning the IPoC client the first source IP address.

20. The method of claim 17 further comprising forwarding the first IP packet over the IP network without including the first name therein.

* * * * *